Nov. 28, 1967  R. J. TOLMIE  3,355,650
ELECTRICAL POWER AND CONTROL MECHANISM
FOR ELECTRICAL APPLIANCES
Filed Dec. 26, 1963  2 Sheets-Sheet 1

INVENTOR.
ROBERT J. TOLMIE

BY *A. J. DeAngelis*

ATTORNEY

United States Patent Office 3,355,650
Patented Nov. 28, 1967

1

3,355,650
ELECTRICAL POWER AND CONTROL MECHANISM FOR ELECTRICAL APPLIANCES
Robert J. Tolmie, Fairfield, Conn., assignor to Sperry Rand Corporation, New York, N.Y., a corporation of Delaware
Filed Dec. 26, 1963, Ser. No. 333,477
17 Claims. (Cl. 318—342)

The invention relates to electrical power and control mechanisms for electrical appliances and especially to such mechanisms for appliances of relatively small size, weight and capacity adapted for energization from an external alternating power source.

Small appliances, such as electric dry shaver apparatus, having a driving motor and means for converting alternating power supplied from an external source to unidirectional power for energization of the driving motor, are already well known in the art. With the advent of world-wide distribution of such small appliances, it has become desirable to provide an appliance which is universal in that it is equipped with electrical circuitry which permits proper operation of the appliance at a variety of locales, notwithstanding that at such locales the alternating power available may differ in voltage magnitude to a considerable extent.

Prior art attempts to provide such a universal appliance utilize manual switches having a plurality of contacts and switching positions to interconnect selectively any one of a variety of energizing circuits in accordance with the alternating power available for the appliance.

It is desirable to provide a unidirectional appliance equipped with electrical circuitry which automatically provides proper energization to the driving motor notwithstanding wide variances in the voltage magnitude of the applied power.

It is, therefore, an object of this invention to provide for such small electrical appliances improved electrical power and control mechanism which automatically effects proper energization of the appliance from external alternating power sources of differing voltage magnitudes.

Another object is to provide such electrical power and control mechanism which is of simple, economical design and utilizes electronic solid state components of minimal size and weight.

A further object is to provide such an electrical power and control mechanism which automatically provides substantially constant energization to the appliance operating device, such as a motor, notwithstanding that the magnitude of the input energizing voltage to the appliance varies over a wide range.

The invention involves providing in an electrical appliance voltage limiting means automatically operative for maintaining constant the energization applied to the appliance operating device for proper operation of the appliance without substantially increasing the power consumption of the appliance, notwithstanding that the applied alternating input voltage varies in magnitude over a wide range.

In carrying out the invention, according to a preferred embodiment, a reactive impedance is provided in the alternating power input circuit of the electrical appliance to reduce the volt magnitude of the applied alternating voltage to a certain level. This reduced alternating voltage is rectified and applied to the operating device of the appliance through a power control circuit. The control circuit automatically maintains the power applied to the operating device to a predetermined proper level by automatically switching the operating device electrically in and out of the power input circuit to effectively provide constant power thereto. The automatic control circuit includes

2 a silicon controlled rectifier, means for controlling the firing of the rectifier and a shunting capacitor connected across the operating device.

A second embodiment utilizes a control circuit including two silicon controlled rectifiers connected at the input to the alternating to unidirectional power converter. One of the rectifiers serves as an automatic "on-off" switch for positive half waves of the applied alternating voltage and the other as an "on-off" automatic switch for the negative half waves of the applied alternating voltage effectively to maintain the alternating power applied to the input of the power converter constant. This controlled applied alternating power is then converted to unidirectional power and applied to the operating device. A stabilizing capacitor shunts the operating device.

In still another embodiment of the invention the applied alternating power is first applied to a half wave rectifier and then to an automatic control circuit, containing a silicon controlled rectifier having a switching cycle to provide constant power to the operating device of the appliance, which device is shunted by a stabilizing capacitor.

With the subject arrangement, the appliance may be connected to alternating power supply lines having wide variances of voltage magnitudes without the necessity of providing a complex mechanical switch or necessitating that the operator of the appliance, prior to its use, select manually the correct input circuit to properly energize the appliance. The invention by, thus, obviating the need for the operator to select the correct input circuit in some cases prevents damage to the appliance and perhaps to the user thereof.

Features and advantages of the invention will be seen from the above and from the following description of operation when considered in conjunction with the drawings and from the appended claims.

Figure 1:
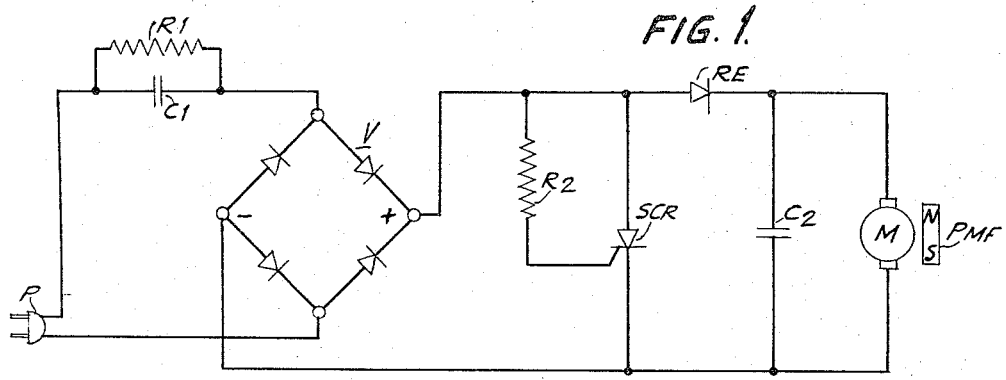
FIG. 1 is a simplified schematic wiring diagram of electrical power and control mechanism for an electric motor driven appliance, including means for converting alternating power supplied at various voltage magnitudes to unidirectional power and automatically maintaining such unidirectional power applied to the motor at a predetermined level of energization.
Figure 8:
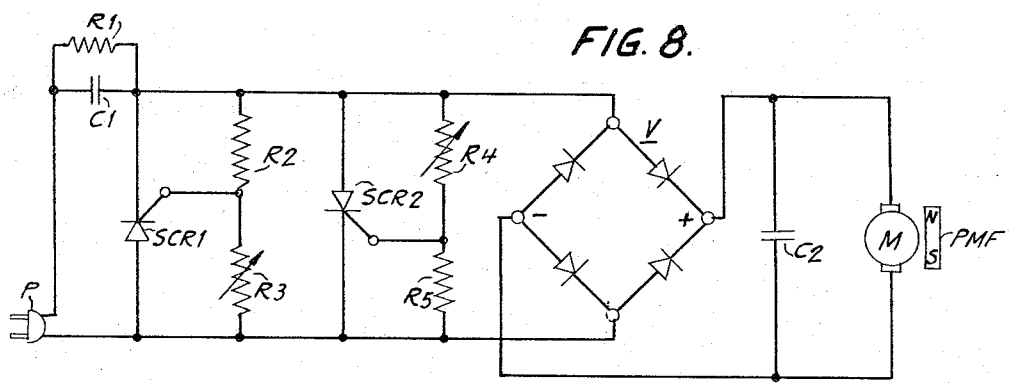
Figure 9:
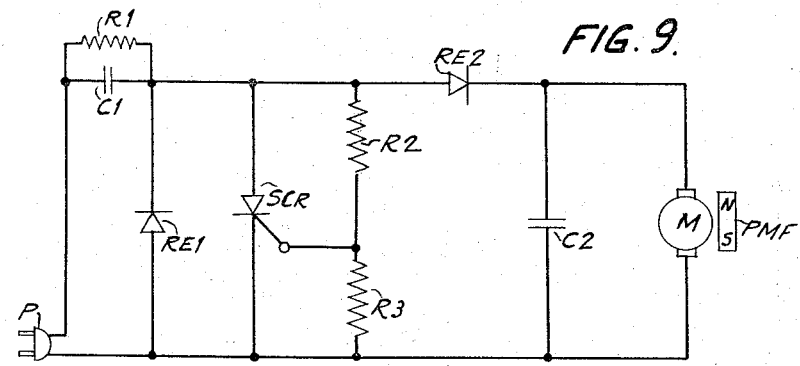

FIG. 8 is a simplified schematic wiring diagram of a modified embodiment of the electrical power and control mechanism of FIG. 1, wherein electronic switching maintains the alternating power input to a full wave rectifier substantially constant for conversion to unidirectional power; and FIG. 9 is a simplified schematic wiring diagram of another modified embodiment of the electrical power and control mechanism of FIG. 1 and provides an automatic power control circuit for maintaining constant the power output of a half wave rectifier.

Referring to FIG. 1, wherein the preferred embodiment of the subject invention is illustrated, M designates the rotor of a direct current driving motor of a small appliance, such as a dry shaver, and PMF designates its permanent magnet field. P designates a male electrical plug adapted for connection to a source of alternating power (not shown), such as, for example, as is available in the usual household from the standard alternating power female outlet. V designates a full wave bridge type rectifier for converting applied alternating power to unidirectional power for energization of motor rotor M.

A voltage dropping capacitor C1 is connected in the input of full wave bridge rectifier V to reduce the magnitude of applied voltage to a predetermined value. Resistor R1, shunting capacitor C1, permits capacitor C1 to discharge therethrough, when the applied power is disconnected from the circuitry.

The output of rectifier V is applied to a control circuit which automatically maintains the energization of motor rotor M to substantially a predetermined proper level notwithstanding wide variations in the magnitude of the voltage of the applied power. The control circuit includes a silicon controlled rectifier SCR of the 3TCRH type; its anode-cathode circuit being connected in shunting relationship across the output of rectifier V and its control electrode being connected through a current limiting resistor R2 to the positive output terminal + of bridge rectifier V. A capacitor C2 is connected in shunting relationship across motor rotor M and in series with a selenium diode RE to the output of rectifier V. Diode RE prevents the discharge of capacitor C2 through the anode-cathode circuit of the silicon controlled rectifier SCR, under conditions where capacitor C2 has charged and the silicon controlled rectifier SCR is in conducting condition, as will be now described.

To illustrate the operation of the subject mechanism, assume that it is desired to operate the shaver driving motor from an external alternating power source which supplies alternating power at greatly varying voltage magnitudes, say, for example, at from 110 volts to 250 volts at a frequency of 50 cycles per second. Under such conditions, for one tested embodiment of the invention, satisfactory operation was obtained with resistors R1 and R2 at 270 kilohms and 12 kilohms, respectively; and capacitors C1 and C2 at 3 and 20 microfarads, respectfully.

Assume that male plug P is connected to an alternating power outlet (not shown) which supplies such variable power. The input voltage is applied to full wave rectifier V through capacitor C1 which reduces the voltage applied to a predetermined level. The rectified output of rectifier V is applied across the anode-cathode circuit of silicon controlled rectifier SCR and across resistor R2, biasing the control electrode of silicon controlled rectifier SCR. The rectified output is also applied simultaneously across shunting capacitor C2 through diode RE, charging the capacitor, and across motor rotor M, energizing the driving motor, thereby causing operation thereof.

At a lower voltage input, say at a level of 110 volts, silicon controlled rectifier SCR remains in nonconducting condition, preventing current flow through its anode-cathode circuit. Biasing resistor R2 is selected of an ohmic value to cause rectifier SCR to conduct through its anode-cathode circuit and apply a "short circuit" or low impedance shunt path across the output of bridge rectifier V under conditions where the applied input voltage magnitude attains a predetermined level which is above that required for proper operation of motor rotor M. Resistor R2 in conjunction with capacitor C1 provides an R-C timing circuit which controls the "firing angle" or point of conduction of silicon controlled rectifier SCR.

For example, assume that the voltage of the applied power is raised in magnitude such that the output of rectifier V attempts to apply power to motor rotor M at a voltage value in excess of the value required to run the motor properly. As the magnitude of voltage applied across biasing resistor R2 attains such excess value, resistor R2 allows a sufficient amount of current to flow through the control "gate" or circuit of the rectifier SCR to cause firing of rectifier SCR. Upon firing, rectifier SCR conducts through its anode-cathode circuit "shorting" the output of bridge rectifier V, since when rectifier SCR is in conducting condition the impedance through its anode-cathode circuit is substantially zero. Diode RE prevents capacitor C2 from discharging through the low impedance anode-cathode circuit of rectifier SCR. Capacitor C2 instead begins discharging through motor rotor M, tending to maintain proper energization of the motor rotor; the discharge rate being determined by the resistive impedance inherent in the motor rotor circuit and the value of capacitor C2.

Next assume that either the positive or negative half cycle of the applied voltage, as the case may be, falls below a certain magnitude, causing the voltage between the anode-cathode electrodes of rectifier SCR and the current through the rectifier gate circuit to fall below the level necessary to maintain rectifier SCR in conducting condition. Under such conditions, rectifier SCR ceases to conduct through its anode-cathode circuit, removing the "short circuit" from across the output of rectifier V. This causes rectifier V to reapply its rectified output to capacitor C2, recharging it, and to motor rotor M.

In effect, the subject control circuitry senses when the applied voltage exceeds a predetermined level and acts as an electronic automatic "on-off" switch, effectively disconnecting and reconnecting electrically the output of full wave rectifier V from and to capacitor C2 and motor rotor MR to maintain the power actually delivered to motor rotor M substantially constant and at a proper level. In this manner, the total power supplied to motor rotor M for energization thereof is maintained at a substantially constant level; what may be termed "chopping" of the applied power occurring as each half wave of positive polarity of the applied voltage rises to a certain value and also as each half wave of negative polarity attains a certain value.

It may be noted that, under conditions where silicon controlled rectifier SCR applies a shunting "short circuit" across the output of rectifier V, the anode-cathode circuit of rectifier SCR draws a considerable amount of current. However, the voltage applied across capacitor C1 rises sharply while such heavy current is being drawn, and, since capacitor C1 is capacitive impedance, the total power consumed by the circuit remains low in spite of the heavy current drain.

Figure 2:
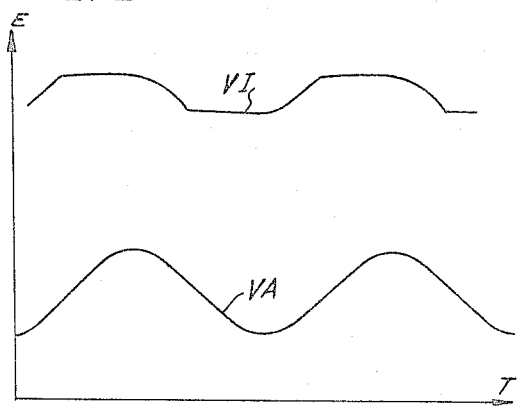
FIGS. 2 through 7 are copies of oscillographs taken of various voltage wave forms appearing in a tested embodiment of the circuit of FIG. 1.
Figure 4:
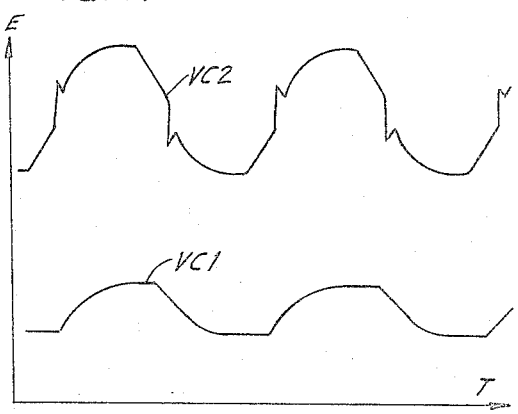

The operation of the subject automatic control circuit may be seen in the voltage waveforms of the oscillograph copies shown in FIGS. 2 through 7. The voltage waveforms shown vary in magnitude along the vertical axis E with respect to the horizontal time axis T; no attempt having been made to designate zero voltage and time. Referring to FIG. 2 the waveform designated VA is of the alternating power input voltage applied to the circuit of FIG. 1 across the prongs of male plug P. The upper waveform, designated VI, is the waveform of the alternating voltage applied to the input terminals of full wave bridge rectifier V. Waveform VI is input waveform VA reduced in magnitude and changed somewhat in shape by capacitor C1.

Figure 3:
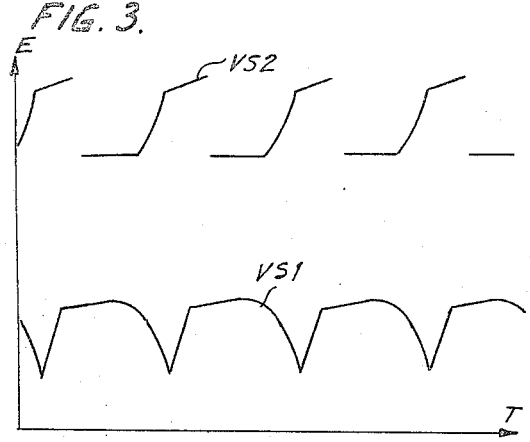

In FIG. 3, the waveform designated VS1 is the rectified unidirectional voltage output of bridge rectifier V of FIG. 1, as it appears across the anode-cathode circuit of silicon controlled rectifier SCR under conditions where the rectifier SCR has not as yet "fired," i.e., is not conducting through its anode-cathode circuit. Next assume that the alternating input voltage VA (FIG. 2) is raised above a certain value, say 110 volts, necessary to operate motor rotor M (FIG. 1) at a proper speed, say to 130 volts. For each half wave of the applied voltage whether of negative or positive polarity, as the case may be, as the voltage magnitude exceeds such certain value, rectifier SCR, as has been previously described, is caused to fire and conduct through its anode-cathode circuit. Under such conditions, waveform VS2 (FIG. 3) is the voltage across the anode-cathode circuit of rectifier SCR with an alternating input voltage of approximately 130 volts. Rectifier SCR remains in the "on" state until the voltage across its anode-cathode circuit and the current through its gate circuit fall below a certain level. Rectifier SCR then returns to its "off" condition, reapplying the power output of rectifier V to shunting capacitor C2 and motor rotor M, as has been previously described. Waveform VS2 clearly illustrates the electronic "chopping" or switching action of rectifier SCR of the control circuit, as the input alternating voltage magnitude rises to above 110 volts on the half waves of both negative and positive polarity of the input voltage VA (FIG. 2). The voltage output of rectifier V is, therefore, "chopped" at the point where the input voltage reaches a predetermined excess value, say 112 volts, for every half cycle of the applied alternating voltage.

Part of the alternating input voltage appears across the input capacitor C1. This voltage is waveform VC1 of FIG. 4 for the circuit condition before silicon controlled rectifier SCR begins to operate or is "fired." Waveform VC2 is the voltage appearing across capacitor C1, under conditions where rectifier SCR has "fired" and is conducting through its anode-cathode circuit to provide a "short circuit" across the output of rectifier V, as has been previously described. Waveform VC2 illustrates how the magnitude of the voltage across capacitor C1, under such conditions, increases substantially to approximately double its former magnitude.

Figure 5:
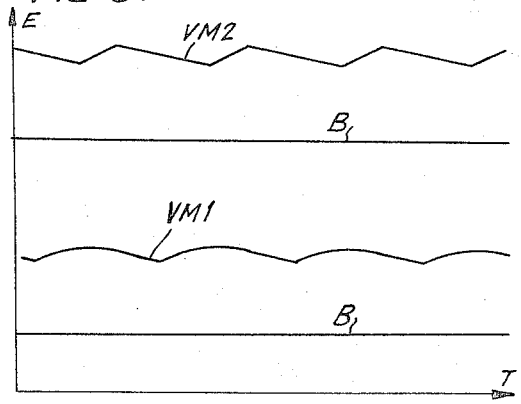
Figure 7:
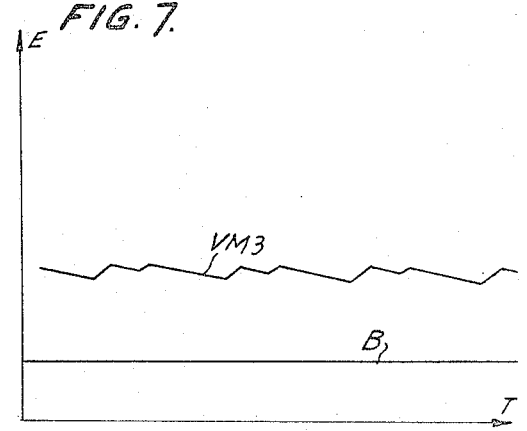

The waveforms VM1 and VM2 of FIG. 5 are the direct current voltage appearing across motor rotor M of FIG. 1 for the two aforementioned different circuit conditions. Each waveform is the alternating component, generally termed the "ripple voltage," of the pulsating unidirectional voltage applied to motor rotor M by the control circuit of FIG. 1. The magnitude of each ripple voltage is indicated by the distance of each waveform above its respective base line B.

Voltage waveforms VM1 and VM2 illustrate the filtering action of storage shunting capacitor C2. Waveform VM1 is the filtered ripple voltage before silicon controlled rectifier SCR (FIG. 1) has begun to operate or has "fired," and corresponds to unfiltered voltage waveform VS1 of FIG. 3 (the voltage waveform across the anode-cathode circuit of rectifier SCR). Voltage waveform VM2 of FIG. 5 is the filtered rippled voltage after silicon controlled rectifier SCR has "fired" and shorted the output of the rectifier V, as has been previously described. This waveform VM2 corresponds to voltage waveform VS2 of FIG. 3. Waveform VM2 clearly illustrates how capacitor C2 (FIG. 1) acts to maintain the energization to motor rotor M constant, especially during the periods that the output of rectifier V is "chopped" to zero magnitude by the electronic switching circuit.

Next assume that the applied input alternating voltage is increased further. Under such conditions, silicon controlled rectifier SCR "chops off" a greater portion of the rectified direct current voltage output of rectifier V. This is illustrated by the voltage waveforms VS3 and VS4 of FIG. 6, wherein waveform VS3 is the voltage appearing across the anode-cathode circuit of rectifier SCR, under conditions where the applied alternating power is at a voltage magnitude of 195 volts. The power control action of the automatic electronic switch of FIG. 1 may be seen by comparing voltage waveform VS3 with waveform VS2 (FIG. 3) where the applied input voltage was only of 130 volt magnitude.

Figure 6:
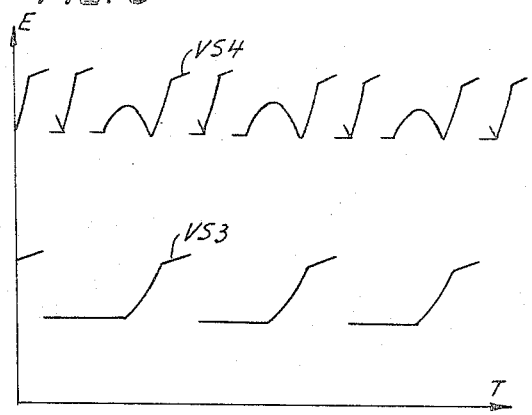

Waveform VS4 of FIG. 6 is the voltage appearing across the anode-cathode circuit of rectifier SCR, under conditions where the applied input voltage is at the still greater magnitude of 230 volts. Under such conditions, it is seen that silicon controlled rectifier SCR (FIG. 1) has turned "on" and "off" or fired twice for each half cycle of the applied voltage instead of only once as at the lower voltages (see waveforms VS3 (FIG. 6), VS2 (FIG. 3)). Waveform VM3 (FIG. 7) is the filtered unidirectional "ripple" voltage applied to motor rotor M (filtered by shunting capacitor C2) with the applied input voltage at 230 volts.

A comparison of ripple voltage waveform VM3 compared with waveforms VM1 and VM2 of FIG. 5 clearly demonstrates that the subject automatic control automatically maintains the voltage applied to the motor rotor MR substantially constant, notwithstanding wide variations in the magnitude of the applied input voltage. With such an arrangement, if it is desired, the appliance driving motor may be operated from any one of several standard but different external power sources (not shown) which supply alternating power at, say, for example, 127, 160 and 220 volts, respectively, at a frequency of 50 cycles per second, as is supplied in certain parts of Europe. With such an arrangement, the appliance is a universal appliance which may be sold for use throughout the world, or, alternately, may be carried by a traveler from one locale to another having power sources of different voltage magnitudes and operated successfully in each locale.

In the modified embodiment of FIG. 8, the energizing power applied to motor rotor M is maintained at a substantially constant level by control circuitry similar to that previously described for FIG. 1. The control circuitry of FIG. 8 uses two silicon controlled rectifiers SCR1 and and SCR2 connected with their respective firing circuits at the input to full wave bridge rectifier V. Both rectifiers SCR1 and SCR2 are of the 3TCRH type. Alternating power is applied from plug P across the anode-cathode circuits of both rectifiers SCR1 and SCR2 and to their respective firing circuits through input voltage dropping capacitor C1 which lowers the voltage magnitude of applied power to a predetermined value. Resistors R2 and R3 are connected in the gate circuit of rectifier SCR1 while resistors R4 and R5 are connected in the gate circuit of rectifier SCR2. These resistors in conjunction with capacitor C1 provide R-C timing circuits for controlling the "firing" angle of their respective silicon controlled rectifiers SCR1 and SCR2.

The rectifiers are oppositely disposed, such that rectifier SCR1 effectively senses and "chops" the half wave of positive polarity of the applied voltage input, while rectifier SCR2 senses and controls the half wave of negative polarity of the applied input voltage. Capacitor C2, shunting motor rotor M across the output of full wave bridge rectifier V, functions as it does in the circuit of FIG. 1 to filter the unidirectional voltage applied to motor rotor MR to provide substantially constant energization thereto. Bridge rectifier V prevents the discharge of shunting capacitor C2 other than through motor rotor MR, under conditions where either silicon contolled rectifier SCR1 or SCR2 is in the "on" condition, shorting the input to the rectifier bridge V.

For one tested embodiment which operated satisfactorily, capacitors C1 and C2 were selected at 2.8 and 20 microfarads, respectively, while resistor R1 was selected of 270 kilohms. Timing resistors R2 and R5 were selected at 5 kilohms, while resistors R4 and R3 were selected of 15 kilohms.

The circuitry of FIG. 9, illustrates another modified embodiment of the subject invention in which half wave rectified power is applied to motor rotor M and controlled by means of a silicon controlled rectifier SCR provided at the output of half wave rectifier RE1. The power supplied to motor rotor M is maintained substantially constant by shunting capacitors C2, as has been described for the previous embodiments. The applied alternating power is supplied to half wave rectifier RE1 through voltage dropping capacitor C1 which drops the voltage to a predetermined level. Half wave rectifier RE1 applies rectified half wave voltage across the anode-cathode circuit of silicon controlled rectifier SCR and its firing circuit consisting of resistors R2, R3. The output of rectifier RE1 is also applied through diode RE2 to capacitor C2 connected across motor rotor M. When the half wave rectified power rises to above a certain point, sufficient current flows through resistors R2, R3 and the gate of rectifier SCR to cause rectifier SCR to fire and conduct through its anode-cathode circuit to provide effectively an electrical short circuit across the output of half wave rectifier RE1. Capacitor C2 which is charged through diode RE2 is prevented from discharging by the diode except through motor rotor MR, thereby maintaining energization of the motor rotor, as has been described for the other embodiments. Silicon controlled rectifier SCR, as has been explained for the prior circuits, remains in conducting condition until the applied voltage across its anode-cathode circuit and its gate circuit decreases sufficiently to cause it to cease conduction and return to its "off" condition. Such "chopping" of the power applied by half wave rectifier RE1 every positive half wave of the applied alternating voltage is effective to provide substantially constant energization to motor rotor M.

As changes can be made in the above described construction and many apparently different embodiments of this invention can be made without departing from the scope thereof, it is intended that all matter contained in the above description or shown in the accompanying drawings be interpreted as illustrative only and not in a limiting sense.

What is claimed is:

1. In combination, operating means for an electrical appliance; electrical energy storage means electrically connected to said operating means and including a capacitor in parallel with said operating means; power converting means for converting alternating power applied thereto to unidirectional power; electronic switching means electrically interconnected to said power converting means and consisting of a silicon controlled rectifier and its associated gating circuit connected at the output of said power converting means, said rectifier selected to conduct and apply a low impedance substantially short-circuit path across the output of said power converting means under conditions where the rectified power voltage from said power converting means exceeds a predetermined voltage magnitude to interrupt unidirectional power applied by said converting means to said operating means and said capacitor; and said combination further including unidirectional current conducting means electrically interposed between said capacitor and said silicon controlled rectifier, said capacitor operable upon said conduction of said silicon controlled rectifier to supply stored power received from said power converting means to said operating means for maintaining energy thereto in the conducting state of said rectifier with said unidirectional current conducting means preventing the discharge of said capacitor through said silicon controlled rectifier.

2. A combination as set forth in claim 1 wherein voltage limiting impedance means is connected electrically in the input of said power converting means for limiting the magnitude of the voltage of the alternating power applied to said converting means to a predetermined level.

3. The combination set forth in claim 2 wherein said voltage limiting means is a capacitive impedance.

4. The combination set forth in claim 1 wherein said electronic switching means consists of a silicon controlled rectifier and its associated gating circuit are connected at the output of said power converting means and being operative each half cycle of said applied alternating power to effectively disconnect electrically said power converting output from said operating means and capacitor.

5. The combination as set forth in claim 1 wherein said power converting means consists of a full-wave bridge rectifier.

6. The combination as set forth in claim 1 wherein said silicon controlled rectifier has an anode-cathode circuit connected across the output of said power converting means for effectively establishing a short circuit across said output under conditions where said silicon controlled rectifier fires and conducts through its said anode-cathode circuit.

7. In combination, operating means including a motor rotor for an electrical appliance; electrical energy storage means electrically connected to said operating means and including a capacitor connected in parallel with said motor rotor; power converting means for converting alternating power applied thereto to unidirectional power for said operating means and said capacitor, electronic switching means electrically interconnected to said power converting means and automatically operative in response to power application at a predetermined voltage magnitude for interrupting unidirectional power applied by said power converting means to said operating means and said capacitor, said electronic switching means consisting of a silicon controlled rectifier with its associated anode cathode gating circuit connected to the output of said power converting means in parallel with said motor rotor and capacitor, said rectifier selected to fire and conduct through its anode cathode circuit to apply a low impedance short circuit path across the output of said power converting means under conditions where the rectified power voltage exceeds a said predetermined magnitude, and unidirectional current conducting means comprising a diode electrically interposed between said capacitor and said silicon controlled rectifier, said capacitor operable upon said operation of said switching means to discharge stored power received from said power converting means to said operating means with said diode preventing discharge of said capacitor through said anode cathode circuit of said silicon controlled rectifier when the latter is in conducting condition.

8. In an electrical appliance having operating means including a motor rotor operable from a source of unidirectional power of predetermined magnitude, a power and control mechanism for accommodating said appliance for connection to input sources of varying alternating potential, said power and control mechanism comprising alternating power input circuit means, means provided in said input circuit to reduce the voltage magnitude of the applied alternating voltage, power converting means having input means and output means for converting alternating power applied to the input means from said voltage reducing means to unidirectional power at the output means thereof for application to said motor rotor for operating said motor, control means comprising electronic switching means including means for sensing when the said output voltage of said power converting means exceeds a predetermined level, said electronic switching means operable when said excess value is sensed to apply a short circuit and interrupt the power application from said power converting means to said motor rotor and being further operative to cause reestablishment of said power application when said output voltage falls to a certain level, and electrical energy storage means connected in parallel with said motor rotor for receiving electrical energy for storage from said power converting means simultaneously with said motor rotor, and said storage means operable to supply said stored electrical energy to said motor rotor for maintaining operation thereof when said switching means is in said operable condition to interrupt power application from said power converting means to said motor rotor.

9. Power and control mechanism as set forth in claim 8 wherein unidirectional current conducting means are interposed electrically between the output terminals of said power converting means and said electrical energy storing means for preventing application of said stored energy to said output terminals.

10. Power and control mechanism as set forth in claim 8 wherein said power converting means is provided with a pair of input terminals and a pair of output terminals, said output terminals being connected to said motor rotor for applying unidirectional power thereto; said electrical energy storage means comprising a capacitor connected in shunting relationship across said motor rotor, said electronic switching means having a pair of input terminals for connection to a source of alternating power, said electronic switching means being operative for applying said alternating power to said input terminals of said power converting means and being further operative under conditions where the voltage magnitude of said alternating power rises above a predetermined value for applying an effective electrical short circuit across the input terminals of said power converting means; said capacitor being selected of sufficient storage capacity to maintain substantially constant energy to said motor rotor under conditions where said short circuit is applied.

11. Power and control mechanism as set forth in claim 10 wherein said electronic switching means includes two silicon controlled rectifiers and their respective firing circuits, said silicon controlled rectifiers being electrically connected in shunting relationship across said input terminals of said power converting means and oppositely disposed one to the other, said firing circuit for a first one of said silicon controlled rectifiers being adjusted to cause conduction through the anode-cathode circuit of said first rectifier under conditions where said applied alternating power voltage exceeds a predetermined magnitude during half-cycles of positive polarity and the other of said silicon controlled rectifiers functioning likewise where said applied alternating power voltage exceeds said predetermined magnitude during half-cycles of negative polarity.

12. A control mechanism as set forth in claim 11 wherein said power converting means consists of a full-wave bridge rectifier.

13. Power and control mechanism as set forth in claim 8 wherein said power converting means comprises half-wave rectifying means operable when energized by an alternating power source for applying half-wave rectified power to said motor rotor, said half-wave rectifying means having a pair of output terminals, said electronic switching means connected to said output terminals and being operative for effectively applying a short circuit path across said output terminals, under conditions where the magnitude of the voltage of said half-wave rectified power exceeds a predetermined value and for removing said short circuit when said magnitude decreases below a certain value, and unidirectional current conducting means, said electrical energy storage means electrically connected in shunting relationship with said motor rotor and in series with said unidirectional current conducting means to said output terminals of said half-wave rectifying means.

14. Mechanism as set forth in claim 13 wherein said energy storage means consists of a capacitor selected of a storage value sufficient to maintain substantially constant energization to said motor rotor under conditions where said electronic switching means short circuit said output terminals of said half-wave rectifying means.

15. Mechanism as set forth in claim 13 wherein said unidirectional current conducting means consists of a rectifier connected in circuit with said electrical energy storage means to prevent current conduction from said storage means through said short circuit path.

16. Mechanism as set forth in claim 13 wherein said electronic switching means consists of a silicon controlled rectifier and a gating circuit therefor, said silicon controlled rectifier being connected across said output terminals of said half-wave rectifying means and said gating circuit being adjusted to cause conduction of said silicon controlled rectifier under conditions where the magnitude of the voltage appearing at said output terminals exceeds a predetermined level.

17. Power and control mechanism as set forth in claim 13 wherein said electronic switching means includes means for sensing when the magnitude of the voltage appearing at said output terminals of said half-wave rectifying means exceeds a predetermined value, said electronic switching means being operative when said excess value is sensed for effectively electrically disconnecting said output terminals of said half-wave rectifying means from said motor rotor and said energy storage means.

References Cited
UNITED STATES PATENTS

| | | | |
|---|---|---|---|
| 2,926,295 | 2/1960 | Allen | 318—345 X |
| 3,170,105 | 2/1965 | Muldoon | 318—341 |
| 3,213,349 | 10/1965 | Gutzwiller | 323—22 |
| 3,214,673 | 10/1965 | Cock | 321—18 |
| 3,215,896 | 11/1965 | Shattuck et al. | |
| 3,246,229 | 4/1966 | Floyd | 321—10 |

OTHER REFERENCES

R. Frenzel and F. Gutzwiller, "Solid State Thyratron Switches, Kilowatts" Electronics, Mar. 28, 1958, pp. 52–55.

"Notes on Application of SCR's," Application Engineering, December 1958, p. 51.

ORIS L. RADER, *Primary Examiner.*

S. GORDON, J. C. BERENZWEIG, J. J. BAKER,
*Assistant Examiners.*